Patented Aug. 10, 1937

2,089,375

UNITED STATES PATENT OFFICE 2,089,375

RESIN ACID ESTER AND METHOD OF PRODUCING

Irvin W. Humphrey and Joseph N. Borglin, Wilmington, Del., assignors to Hercules Powder Company, Wilmington, Del., a corporation of Delaware No Drawing. Application June 24, 1932, Serial No. 619,121

36 Claims. (Cl. 260—54)

This invention relates to a new composition of matter and method for its production, more particularly, the composition in accordance with this invention involves a heterocyclic alcohol ester of an unsaturated resin acid as abietic, pimaric, pyroabietic, etc., the unsaturation of the alcohol radical, or of the resin acid radical, or of both having been reduced by hydrogenation.

In preparing the composition by the method in accordance with this invention, the monohydric heterocyclic alcohol or the resin acid, or both may be hydrogenated and then reacted in the presence of heat to form a hydrogenated ester, or the alcohol and resin acid may be reacted in the presence of heat and the resultant ester then subjected to hydrogenation.

The monohydric heterocyclic alcohol for use in preparing the composition in accordance with this invention may, for example, be furfuryl alcohol, methoxyfurfuryl alcohol, ethyl furfuryl alcohol, thienyl carbinol ($C_4H_3S \cdot CH_2OH$), tetra hydrofurfuryl alcohol, etc. and the resin acid may be in the form, for example, of commercial abietic acid, wood or gum rosin or hydrogenated rosin, etc. As equivalents for the alcohols indicated, an inorganic ester of the alcohols, as, for example, furfuryl chloride, tetrahydrofurfuryl chloride, etc. may be used and equivalently where an ester is used in place of an alcohol, salts of abietic acid as, for example, sodium abietate, potassium abietate, etc. may be used, preferably in alcoholic solution, in place of abietic acid or rosin.

In carrying out the method in accordance with this invention the alcohol, previously hydrogenated c. not, and the resin acid, previously hydrogenated or not, will, as has been indicated, be reacted in the presence of heat and desirably also in the presence of an acid catalyst as, for example, p-toluene sulphonic acid, hydrogen chloride, boric acid, etc. Where an acid catalyst is used, however, such will be used in small quantity, say in amount of about 0.01%–5.0% in order to avoid excessive polymerization of the alcohol. Further, if desired, a hydrocarbon as, for example, toluene, xylene, mineral spirits, or the like, may be used to assist in removing water of reaction.

In carrying out the method where both the alcohol and the abietic acid have been subjected to hydrogenation, the hydrogenated alcohol and hydrogenated abietic acid are reacted as indicated. On the other hand, where neither the alcohol nor the abietic acid has been subjected to hydrogenation, the product of the reaction is subjected to hydrogenation under pressure and in the presence of a suitable hydrogenation catalyst. Again, either the alcohol or the abietic acid may be subjected to hydrogenation prior to reacting for the formation of the composition and the product of the reaction may or may not be subject to hydrogenation with respect to the alcohol or abietyl radicals or both as the case may be.

In carrying out the method in accordance with this invention the alcohol and abietic acid may be treated in any desired quantities preferably with the alcohol in excess of that required for combination with the resin acid. The reaction may be carried out at any suitable temperature, say for example, within about the range 100–300° C., with or without superatmospheric pressure depending upon the temperature. The time required will be dependent substantially upon the temperature and whether or not a catalyst is used. As has been indicated, an inorganic ester of a monohydric heterocyclic alcohol and a salt of abietic acid may be used equivalently for the alcohol and abietic acid and when such are used they will be desirably used in alcoholic solution as in solutions of ethyl, butyl, methyl, etc. alcohol and the reaction will be carried out under pressure depending upon the temperature used in order to avoid loss of the alcohol.

As illustrative of procedure in accordance with the method of this invention, for the production, for example, of tetrahydrofurfuryl abietate, for example, 200 grams of rosin, 200 grams of tetrahydrofurfuryl alcohol, obtained by hydrogenation of furfuryl alcohol and 50 cc. of toluene are refluxed for about forty hours at about 200° C. Alternatively 1000 grams of rosin and 1000 grams of tetrahydrofurfuryl alcohol, 25 grams of p-toluene sulphonic acid and 50 cc. of toluene are treated at about 160° C. for about 16 hours.

The reaction may be speeded up in either case by autoclaving at say about 200–250° C. or by proceeding continuously as by passing the reagents through a reaction chamber at a relatively high temperature.

The crude product, tetrafurfuryl abietate may be purified by washing with an alkaline solution, if necessary, for example, a sodium carbonate solution, to remove excess abietic acid if present, distilling to remove volatiles and fractionation in vacuo to remove any polymerized ester if desired, though it will be understood that the polymerized ester will be as advantageous and equivalent of the unpolymerized ester for certain uses. The ester may be refined by dissolving in a suitable solvent, such as gasoline, mineral spirits, etc. and agitating with a substantially immiscible color body solvent as phenol, resorcinol, aniline, etc.

The ester, tetrafurfuryl abietate, for example, may be formed by reacting 100 grams tetrahydrofurfuryl chloride and 300 grams sodium resinate in solution in 1000 g. ethyl, or butyl, etc. alcohol by heating at about 125° C. under a pressure of about 110 pounds per square inch, for about one hour.

Tetrahydrofurfuryl abietate may constitute the product in accordance with this invention or if desired the abietyl radical may be hydrogenated for the production of tetrahydrofurfuryl dihydroabietate. Thus, for example, the tetrahydrofurfuryl abietate may be subjected to hydrogenation by heating at a temperature of say about 125–200° C. under a hydrogen pressure of say about 100–3000 pounds per square inch and if desired in the presence of a base metal hydrogenation catalyst as, for example, a nickel, cobalt, copper-nickel, a metallic chromite as zinc, copper, nickel chromite, etc., etc. hydrogenation catalyst, or their mixtures, either unsupported or supported on kieselguhr, silica gel, filter cel, etc. Hydrogenation catalysts as palladium and platinum may also be employed. As illustrated, for example, 1000 parts by weight of tetrahydrofurfuryl abietate are heated at a temperature of say 160° C. with 20 parts by weight of an active nickel hydrogenation catalyst (15% nickel), supported, for example, on kieselguhr, for about 1.5 hours, under 400 pounds pressure. Hydrogenation may be effected continuously by passing the abietate over a stationary activated hydrogenation catalyst as nickel, at about 125–200° C. preferably under pressure as 300–2000 pounds.

Alternatively the product in accordance with this invention may be produced by effecting the reaction between, for example, furfuryl alcohol and hydrogenated abietic acid, as dihydro or tetrahydro abietic acid. The reaction will be carried out as described above; i. e. with the application of heat and, if desired, in the presence of an acid esterification catalyst; and as will be appreciated the abietic acid may be hydrogenated by effecting the hydrogenation of, for example, commercial abietic acid or rosin, as by agitating refined wood rosin at 125–175° C. with 2% of a nickel hydrogenation catalyst under 500–3000 pounds hydrogen pressure.

Again alternatively the product in accordance with this invention may be produced by effecting the hydrogenation of the ester, as for example, furfuryl abietate, as indicated above; i. e. by heating with hydrogen under pressure and if desired in the presence of a hydrogenation catalyst. By such procedure, for example, both the alcohol and the abietyl radical will be hydrogenated and the product will be, for example, tetrahydrofurfuryl dihydro or tetrahydro abietate, or a mixture of the two. The tetrahydrofurfuryl abietate may, if desired, be reacted with maleic anhydride instead of hydrogen. Thus, by heating one mole of tetrahydrofurfuryl abietate with one mole of maleic anhydride at 125–175° C. a combination occurs between the tetrahydrofurfuryl abietate and the maleic anhydride. The acidic reaction product may be esterified with a monohydric alcohol such as ethyl, methyl, propyl, butyl, bornyl, tetrahydrofurfuryl, benzyl, cyclohexanol, abietyl, stearol, etc. or either partially or completely with a polyhydric alcohol as ethylene glycol, glycerol, pentaerythrite, etc. or mixtures of the foregoing alcohols yielding products adapted for use in protective coatings or in plastics. The esterified or partially esterified product may be modified by the addition of rosin, hydrogenated rosin, linseed oil, or China oil, the free acids of these oils, acids as stearic, abietic, furoic, succinic, adipic, etc.

Again the product in accordance with this invention may be produced by reacting an ester of the alcohol which has been hydrogenated and a hydrogenated salt of abietic acid, as for example, hydrogenated furfuryl chloride and hydrogenated sodium abietate, or either the ester or the salt may be hydrogenated. Tetrahydrofurfuryl abietate will show a refractive index of about 1.52, specific gravity around 1.04 and thiocyanate value of 55–60. After hydrogenation its refractive index and specific gravity will be decreased while its thiocyanate value will vary from 0 to 25 depending upon the completeness of the saturation with hydrogen.

As will now be apparent, the product in accordance with this invention will be an ester formed by reacting a monohydric heterocyclic alcohol and resin acid, the saturation of either the alcohol or the abietyl radical or both radicals being reduced by hydrogenation. The product is broadly referred to in the claims appended hereto as a hydrogenated reaction product or ester. Further, as will now be apparent the method in accordance with this invention will involve hydrogenation of either the reaction product or ester or of either or both of the reagents; i. e. the alcohol or equivalent ester or the abietic acid or equivalent salt.

The product in accordance with this invention will be found advantageous for use variously in the commercial arts and more especially as an ingredient in coating compositions as, for example, lacquers, films, various plastic compositions. Either tetrahydrofurfuryl hydro-abietate or tetrahydrofurfuryl abietate may be employed in lacquer compositions, for example, and by using 8 parts of the abietate, 4 parts of dammar, 10 parts of nitrocellulose and 78 parts of solvents and diluents.

It will be understood that by the term "hydroabietate" it is intended to cover both di- and tetrahydro abietates or a mixture thereof.

What we claim and desire to protect by Letters Patent is:

1. The reaction product of a monohydric heterocyclic alcohol and abietic acid the unsaturation of a radical of which is reduced by hydrogen.

2. A monohydric heterocyclic alcohol ester of abietic acid the unsaturation of a radical of which is reduced by hydrogenation.

3. A hydrogenated monohydric heterocyclic alcohol ester of abietic acid.

4. A monohydric heterocyclic alcohol ester of hydrogenated abietic acid.

5. A hydrogenated monohydric heterocyclic alcohol ester of hydrogenated abietic acid.

6. A monohydric heterocyclic alcohol ester of abietic acid the unsaturation of the alcohol radical of which is reduced by hydrogenation.

7. A monohydric heterocyclic alcohol ester of abietic acid the unsaturation of the resinic radical of which is reduced by hydrogenation.

8. A monohydric heterocyclic alcohol ester of abietic acid the unsaturation of both the alcohol radical and the abietyl radical of which is reduced by hydrogenation.

9. Furfuryl abietate the unsaturation of a radical of which is reduced by hydrogen.

10. Furfuryl abietate the unsaturation of the resinic radical of which is reduced by hydrogenation.

11. Furfuryl hydroabietate.

12. The method which includes reacting a monohydric heterocyclic alcohol and abietic acid and hydrogenating the reaction product to reduce the unsaturation of a radical thereof.

13. The method which includes hydrogenating a monohydric heterocyclic alcohol and reacting the hydrogenated alcohol with abietic acid.

14. The method which includes hydrogenating abietic acid and reacting a monohydric heterocyclic alcohol with the hydrogenated abietic acid.

15. The method which includes reacting furfuryl alcohol and abietic acid and hydrogenating the reaction product to reduce the unsaturation of a radical thereof.

16. The method which includes hydrogenating furfuryl alcohol and reacting the hydrogenated alcohol with abietic acid.

17. The method which includes hydrogenating abietic acid and reacting furfuryl alcohol with the hydrogenated abietic acid.

18. The reaction product of a monohydric heterocyclic alcohol which contains a furfuryl nucleus and an unsaturated resin acid, the unsaturation of a radical of the reaction product being reduced by hydrogen.

19. The reaction product of a monohydric heterocyclic alcohol which contains a furfuryl nucleus and abietic acid, the unsaturation of a radical of the reaction product being reduced by hydrogen.

20. The method which includes reacting a monohydric heterocyclic alcohol which contains a furfuryl nucleus and an unsaturated resin acid and hydrogenating the reaction product to reduce the unsaturation of a radical thereof.

21. The method which includes reacting a monohydric heterocyclic alcohol which contains a furfuryl nucleus and abietic acid and hydrogenating the reaction product to reduce the unsaturation of a radical thereof.

22. The reaction product of a monohydric heterocyclic alcohol and an unsaturated resin acid the unsaturation of a radical of the reaction product being reduced by hydrogen.

23. The method which includes reacting a monohydric heterocyclic alcohol and an unsaturated resin acid and hydrogenating the reaction product to reduce the unsaturation of the radical thereof.

24. Tetrahydrofurfuryl abietate.

25. Tetrahydrofurfuryl hydroabietate.

26. The method which includes hydrogenating abietic acid and reacting hydrogenated furfuryl alcohol with the hydrogenated abietic acid.

27. The method which includes reacting a monohydric heterocyclic alcohol which contains a furfuryl nucleus with a resin acid the unsaturation of a radical of which is reduced with hydrogen.

28. The method which includes hydrogenating abietic acid and reacting a monohydric heterocyclic alcohol which contains a furfuryl nucleus with the hydrogenated abietic acid.

29. The method which includes reacting abietic acid with a hydrogenated monohydric heterocyclic alcohol which has a furfuryl nucleus.

30. The method which includes hydrogenating furfuryl alcohol and reacting the hydrogenated furfuryl alcohol with hydrogenated abietic acid.

31. The method which includes reacting a monohydric heterocyclic alcohol and a resin acid in the presence of a hydrocarbon adapted to remove water of reaction and hydrogenating the reaction product to reduce the unsaturation of a radical thereof.

32. The reaction product of a monohydric heterocyclic alcohol and a resin acid selected from the group consisting of abietic acid, pimaric acid and pyroabietic acid, the unsaturation of a radical of the reaction product being reduced by hydrogen.

33. The reaction product of furfuryl alcohol and a resin acid selected from the group consisting of abietic acid, pimaric acid and pyroabietic acid, the unsaturation of a radical of the reaction product being reduced by hydrogen.

34. The reaction product of a monohydric heterocyclic alcohol and a resin acid selected from the group consisting of abietic acid, pimaric acid and pyroabietic acid, the unsaturation of the alcohol radical of the reaction product being reduced by hydrogen.

35. The reaction product of a monohydric heterocyclic alcohol and a resin acid selected from the group consisting of abietic acid, pimaric acid and pyroabietic acid, the unsaturation of the acid radical of the reaction product being reduced by hydrogen.

36. The method which includes hydrogenating abietic acid in the presence of a nickel catalyst under a hydrogen pressure of 500–3000 pounds per square inch and reacting the hydrogenated abietic acid with a monohydric heterocyclic alcohol.

IRVIN W. HUMPHREY.
JOSEPH N. BORGLIN.